United States Patent
Frey et al.

(10) Patent No.: US 9,116,280 B2
(45) Date of Patent: Aug. 25, 2015

(54) HOLDING FRAME FOR AN OPTICAL ELEMENT

(75) Inventors: Peter Frey, Heidenheim (DE); Thomas Reiners, Bachhagel (DE); Ralf Vollmer, Ulm (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 929 days.

(21) Appl. No.: 12/460,232

(22) Filed: Jul. 15, 2009

(65) Prior Publication Data

US 2010/0014304 A1 Jan. 21, 2010

(30) Foreign Application Priority Data

Jul. 16, 2008 (DE) .................. 10 2008 033 383

(51) Int. Cl.
| | |
|---|---|
| G02B 7/02 | (2006.01) |
| F21S 8/10 | (2006.01) |
| B29C 65/08 | (2006.01) |
| B29C 65/56 | (2006.01) |
| B29C 65/00 | (2006.01) |
| B29C 65/48 | (2006.01) |

(52) U.S. Cl.
CPC .............. *G02B 7/022* (2013.01); *F21S 48/115* (2013.01); *F21S 48/1208* (2013.01); *B29C 65/08* (2013.01); *B29C 65/48* (2013.01); *B29C 65/4845* (2013.01); *B29C 65/568* (2013.01); *B29C 66/534* (2013.01)

(58) Field of Classification Search
CPC .. F21Y 101/02; B60Q 1/0683; B60Q 1/2619; F21S 48/145; F21S 48/1233; F21S 48/1208; F21S 49/1255
USPC .......................................... 362/507, 509, 546
See application file for complete search history.

(56) References Cited

U.S. PATENT DOCUMENTS

| | | | | |
|---|---|---|---|---|
| 3,737,653 | A * | 6/1973 | Biggs et al. .................... | 362/308 |
| 5,032,964 | A * | 7/1991 | Endo et al. ..................... | 362/462 |
| 7,234,851 | B2 | 6/2007 | Goraguer | |
| 7,387,413 | B2 * | 6/2008 | Brinkmann et al. .......... | 362/460 |
| 7,621,658 | B2 | 11/2009 | Grotsch et al. | |
| 2001/0018143 | A1 * | 8/2001 | Okazaki .......................... | 429/32 |
| 2002/0149924 | A1 * | 10/2002 | Falicoff et al. .................. | 362/19 |
| 2004/0125613 | A1 * | 7/2004 | Hasegawa et al. ............ | 362/507 |
| 2005/0128762 | A1 | 6/2005 | Goraguer | |
| 2005/0238342 | A1 | 10/2005 | Koyama | |
| 2006/0006319 | A1 * | 1/2006 | Bechtel et al. ................ | 250/239 |
| 2006/0177098 | A1 * | 8/2006 | Stam ............................. | 382/104 |
| 2008/0049436 | A1 * | 2/2008 | Yoshihara et al. ............ | 362/488 |
| 2008/0239743 | A1 * | 10/2008 | McFadden et al. ........... | 362/512 |

FOREIGN PATENT DOCUMENTS

| | | |
|---|---|---|
| DE | 197 39 024 A1 | 3/1999 |
| EP | 0100379 A1 | 7/1982 |
| EP | 0100379 B1 | 10/1986 |
| EP | 19739024 A1 | 9/1997 |
| JP | 2007086149 A | 4/2007 |
| JP | 2007304466 A | 11/2007 |
| WO | WO 2006/097067 A1 | 9/2006 |

OTHER PUBLICATIONS

German Office Action dated Mar. 18, 2009 issued in counterpart German Application No. 2008P12085 DE.
German Office Action dated Jun. 20, 2013 issued in counterpart German Application No. 2008P12085 DE.

* cited by examiner

*Primary Examiner* — Jong-Suk (James) Lee
*Assistant Examiner* — Mark Tsidulko
(74) *Attorney, Agent, or Firm* — Holtz, Holtz, Goodman & Chick PC

(57) ABSTRACT

The holding frame is equipped for holding at least one optical element, the holding frame consisting of an opaque material.

18 Claims, 4 Drawing Sheets

HOLDING FRAME FOR AN OPTICAL ELEMENT

The invention relates to an illumination device, in particular a vehicle headlamp module, comprising at least one light source, at least one optical element and at least one holding frame for holding the at least one optical element. The invention further comprises a holding frame for an illumination device.

US 2005/0128762 A1 describes an illumination device that comprises a lens carrier and a glass lens that is configured to, be arranged in front of a light source, the lens (an optical element imaging by means of light refraction) being assembled with the lens carrier, which is fitted on the light source, the carrier being produced from a plastic material, the lens having a rear side that is configured to point in the direction of the light source, as well as an optical front side and a peripheral edge that connects the rear side and the front side to one another, the lens carrier engaging with the lens at the edge, the illumination device being characterized in that the carrier is fastened on the lens by means of extrusion coating, the material of which the carrier consists surrounding the edge of the lens at least partially. The lens carrier is preferably of transparent design for the purpose of dissipating heat.

It is the object of the present invention to provide further advantageous possibilities for holding an optical element in the case of an illumination device.

This object is achieved by means of an illumination device, in particular a vehicle headlamp module, and by means of a holding frame as claimed in the respective independent claim. Preferred embodiments may be gathered from the dependent claims in particular.

The holding frame is set up to accommodate at least one optical element. The holding frame consists of an opaque material.

For the purpose of simple production, a holding frame is preferred that consists of a plastic, in particular a thermoplastic one.

For the purpose of reducing scattered light particularly effectively, a holding frame is preferred in the case of which the plastic is blackened, for example by means of carbon black particles.

Particularly preferred is a holding frame that consists of PPS ("polyphenylene sulfide", also termed "poly(thio-p-phenylene)"), particularly linear PPS. The good mechanical properties of PPS are retained even at temperatures of far above 200° C., and so continued use up to 240° C. is possible depending on the loading. Even loadings at temperatures of up to 270° C. are withstood in the short term. In addition, the chemical resistance to virtually all solvents, many acids and alkalis as well as, conditionally, to atmospheric oxygen is outstanding even at high temperatures. Furthermore, in addition to a low water uptake, PPS also has a good dimensional stability and inherent flame retardance. It has outstanding electrically insulating properties, is highly impervious to most liquids and gases, has only a slight tendency to creep even at relatively high temperatures, and is also suitable for long, narrow moldings and complex die geometries, because of its good flowability. By contrast with crosslinked PPS, linear PPS can be molded into components by a wide spectrum of processing methods.

A holding frame that has a closed circumferential wall for laterally surrounding the optical element is preferred for effective and all-round reduction of scattered light.

A holding frame in the case of which an inner side of the wall that is provided for the purpose of being directed toward the opitcal element has a light-absorbing surface structure is preferred for the particularly effective reduction of scattered light.

It is possible to this end, for example, to roughen the wall and/or to coat it with a light-absorbing layer.

The holding frame preferably has accommodating regions, in particular depressions, for accommodating matching fastening projections of the at least one optical element.

Furthermore, a holding frame that has at least one optical element held thereby is preferred.

The optical element can consist of glass or transparent plastic, for example silicone, an optical element made from glass being preferred.

The at least one optical element is connected to the holding frame by means of injection molding, caulking, bonding in, latching tight, clamping, shrinking on, ultrasonic welding or press fitting.

In particular, a holding frame is preferred in the case of which the at least one optical element is connected to the holding frame by means of hot caulking. In the case of hot caulking, at least a part of the holding frame is heated to such an extent that it can easily be plastically deformed without reaching the melting point. In this way, a prescribed shape of the holding frame is retained except for regions that are deformed under load. The at least one optical element is fixed on the holding frame by deforming these regions. The hot caulking has the advantage that the loads to be shed in this case are slight, and so the optical element is also not greatly loaded. In addition, hot caulking can be used cost-effectively with a low outlay. By contrast with an injection molding method, the lower temperature level and the faster cooling are advantageous in avoiding thermal loads on the optical element.

In general, the optical element can be any kind of element for beam guidance, for example an optical element based on refraction of light, for example a lens. However, preference is given to a holding frame in the case of which the at least one optical element is designed for beam shaping at least by means of total internal reflection and/or diffraction.

It is particularly preferred when the at least one optical element has a CPC-like region, a CEC-like region and/or a CHC-like region. In particular, it is possible to use a CPC-like concentrator, this being understood as a concentrator whose reflecting side walls at least partially and/or at least largely have the shape of a compound parabolic concentrator (CPC). It is also possible, for example, to use a compound elliptic concentrator (CEC) and/or a compound hyperbolic concentrator (CHC).

It is particularly preferred to use a freeform concentrator. Particularly in the case of use as primary optics in a vehicle headlamp module, a concentrator can preferably serve the purpose of casting light from a light source onto a secondary optics and, in the process, setting a light distribution pattern, for example producing a bright/dark boundary.

Alternatively, or in addition, it can also be preferred for the optical element to have a region like a truncated pyramid or a region like a truncated cone.

The method for mounting an optical element on a holding frame has at least the following steps: inserting fastening projections of the optical element into accommodating regions of the holding frame, and caulking, in particular hot caulking, beaded edges of the holding frame over the fastening projections.

The vehicle headlamp module is equipped with such a holding frame and has at least one semiconductor light source, in particular a light-emitting diode, that is upstream of the optical element functioning as primary optics.

In the following figures, the invention is described in more detail schematically with the aid of an exemplary embodiment. In the process, elements that are identical or identically active can be provided with identical reference numerals for the sake of clarity. In the drawing.

Figure 1:
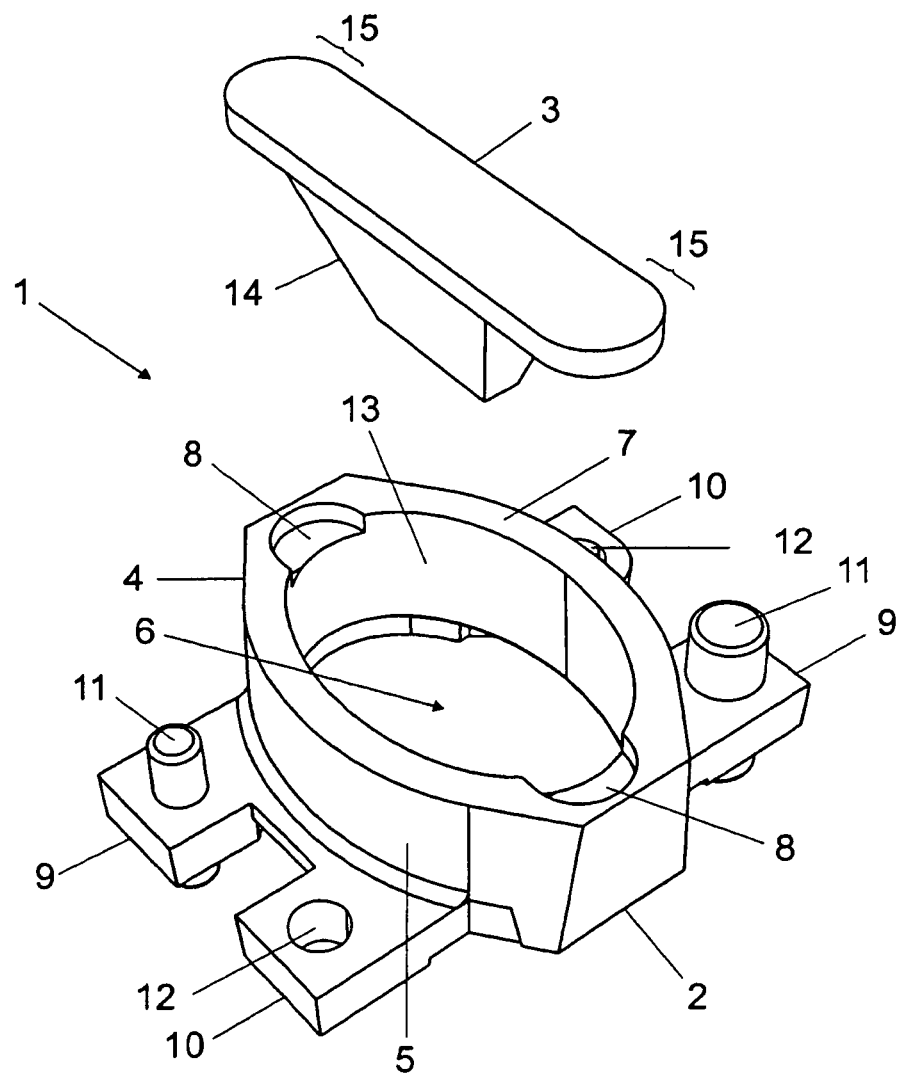
FIG. 1 shows an oblique view from above of a frame in accordance with a first embodiment for an optical element, with the optical element to be held therein separated therefrom.

FIG. 1 shows an optical system 1 having a holding frame 2 and an optical element 3 to be fastened on the frame. The optical system 1 is typically downstream of one or more light sources and serves the purpose of beam guidance for at least one part of the light emitted by the light source or the light sources. The optical system 1 can be used, for example, as part of an automobile luminaire, for example a headlamp.

The holding frame 2 has a hollow basic body 4 open on the top and bottom sides and which is formed by means of a closed circumferential, thick wall 5 having a substantially oval continuous contour. The inner cavity 6 thereby formed in the basic body 4 serves for accommodating the optical element 3. To this end, the basic body 4 has on its upper edge 7 two accommodating regions in the form of opposing depressions 8. In a lower region of the basic body 4, there are four laterally projecting lugs 9, 10 for fastening the holding frame 2 on a luminaire (not illustrated here). For the purpose of guiding the holding frame 2, two obliquely opposing lugs 9 have vertical guide pins 11 whose lower part serves for positioning the holding frame 2 and whose upper part serves for positioning a secondary optics. The other two lugs 10 have through-holes 12 for guiding through fastening screws.

The holding frame 2 is produced from linear PPS. The PPS is blackened in order to minimize reflection of light at the holding frame 2. It is thereby possible to suppress undesired scattered light that strikes the holding frame 2. The inner side 13 of the basic body 4 or the wall 5 thereof is roughened in order to further suppress reflection of light at the holding frame 2. A lateral exit of scattered light from the holding frame 2 is also suppressed by the closed circumferential shape of the wall 5.

The optical element 3 is designed as a total internal reflection (TIR) optics with a basic body 14 in the asymmetric shape of a truncated pyramid. A primary optics thus fashioned enables an efficient reduction in the divergence of light, as a result of which it is possible, in particular, to achieve headlamps with sufficient brightness and having a well defined emission characteristic.

For the purpose of fastening on the holding frame 2, the optical element 3 has a corresponding fastening region with two lateral lug-shaped projections 15. The projections 15 substantially fulfill the fastening function and have only a negligible influence on the optical property of the optical element 3. An advantage of fastening only on the projections 15 also consists in the fact that a bright/dark boundary can then be effectively defined.

The optical system 1 is assembled by bonding by means of joining the optical element 3 to the frame 2. The positioning of the optical element 3 on the holder 2 is performed by inserting the projections 15 into the depressions 8 so that they fit accurately. Before that, a UV-hardening adhesive has been applied to the depressions 8 and/or the projections 15. The bonding process is preceded by a plasma cleaning process or activation process in order to attain an optimum bonded connection.

The optical element 3 is therefore fastened on the holding element 2 only by the projections 15, while the remaining surface is free. Owing to the fact that the projections 15 occupy a small area of the optical element 3 in the circumferential direction, a mechanical loading of the projections, which could be effected by mounting, has only a slight effect on the remaining volume of the optical element 3, since here distortions in the material can be at least partially reduced by the free surface. Consequently, even higher mechanical stresses on the projections 15 do not critically affect the optical element 3. This "good nature toward loading" is all the more pronounced the fewer projections 15 that are used, and the smaller the relative fastening region.

Figure 2:
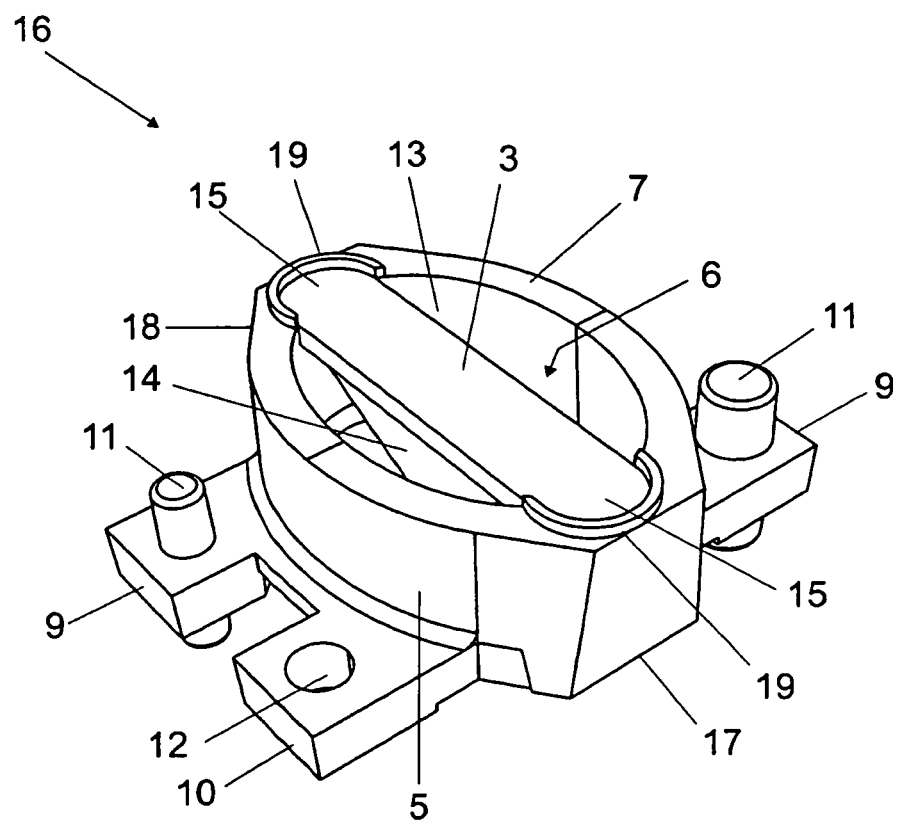
FIG. 2 shows an oblique view from above of a frame in accordance with a second embodiment for an optical element, with an optical element inserted therein but not yet fastened.

FIG. 2 shows an optical system 16 having a holding frame 17 in accordance with a further embodiment, with an optical element 3 that is inserted therein and not yet fastened. In the upper edge 7 of the basic body 18 of the frame 17, a vertical beaded edge 19 is integrated in each case in a fashion surrounding the cutouts. Since the top side of the TIR element 3 essentially terminates in a fashion flush with the upper edge 7, the beaded edge 19 starts directly above the optical TIR element 3 and its shape corresponds to the lateral boundary of the cutout.

Figure 3:
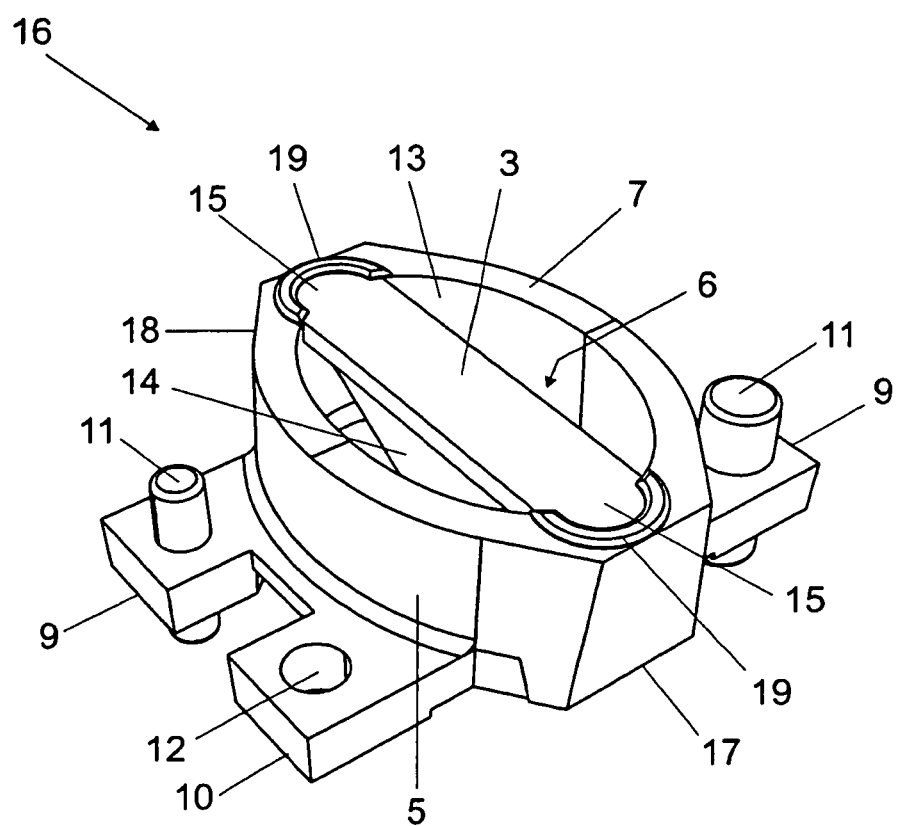
FIG. 3 shows an oblique view from above of the system from FIG. 2, with the optical element fastened on the frame.

FIG. 3 shows the optical element 3 fastened on the frame 17. The fastening is performed by reshaping the beaded edge 19 over the optical element 3, which is performed in this exemplary embodiment by hot caulking. Hot caulking corresponds to caulking a plastic material of the beaded edge 19 that is heated up below the melting limit, since a plastic deformation can thus be accomplished in conjunction with a low application of force. Owing to the reshaping, the optical element 3 is held stably at the desired position in the holding frame 17.

The optical system 16 is tolerant to mechanical loads because of the fact that the optical element 3 is fastened on the holding frame 2 only by means of the projections 15. The remaining surface of the optical element 3 is not in contact with the holding element 2. In conjunction with a view along the inner cavity 6 from above or below, a free space running round up to the projections 15 remains between the optical element 3 and the holding frame 2. The optical element 3 therefore does not close the inner cavity 6. Owing to this "loose" arrangement it is possible to insert any shaped optical elements (concentrators, lenses, diffraction gratings, etc.) into the same holding frame 2.

Figure 4:
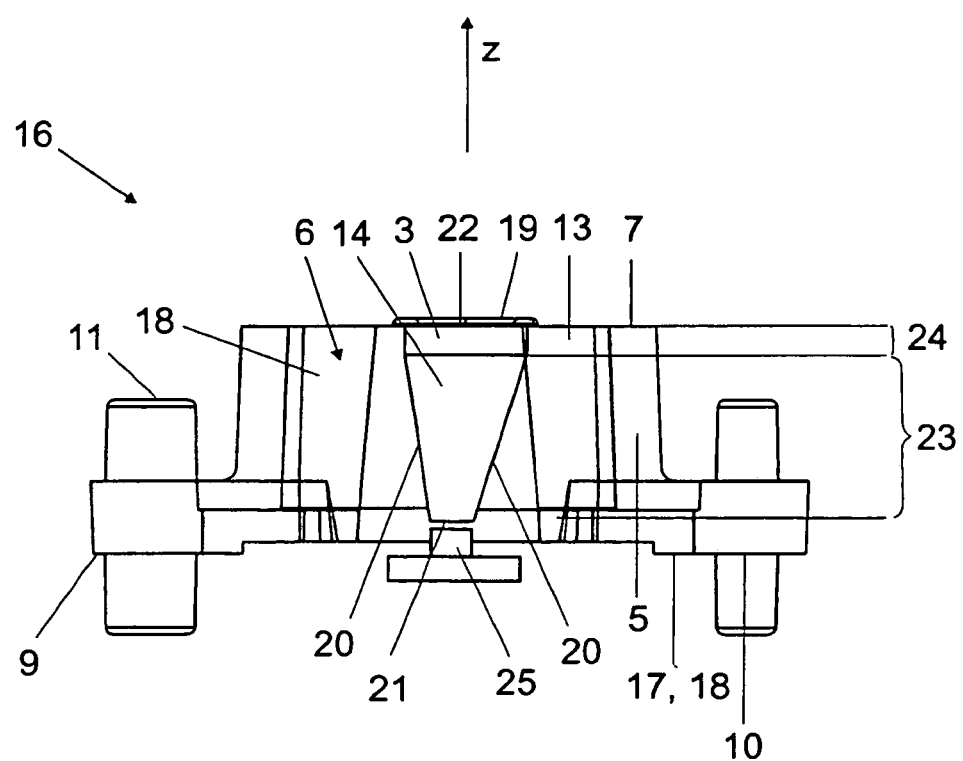
FIG. 4 shows the illumination device in accordance with FIG. 3 as a sectional illustration in side view.

FIG. 4 shows the illumination device in accordance with FIG. 3, in cross section. This view shows that the optical element 3 (TIR concentrator) is not configured symmetrically. Thus, the two side walls 20 have different obliquities, although direct connecting lines between a lower light entry surface 21 and an upper light exit surface 22 run in a substantially rectilinear fashion along them. Furthermore, adjoining above the region 23, in the shape of a truncated pyramid, of the optical element 3 is a region of extent 24 that does not widen and on which the lateral lugs are also arranged. The beaded edges 19 secure the optical element 3 on the edge of the upper light exit surface 22. The optical element 3 is completely surrounded laterally by the holding frame 17 along its longitudinal extent (parallel to the z-axis). It may be seen from the cross-sectional illustration shown here of the narrower side of the optical element 3 that the optical element 3 fills up less than a third of the inner cavity 6, but fills up virtually its entire length (along the z-direction).

During operation, light is fed by a light-emitting diode 25 into the lower light entry surface 21 of the optical element 3, as is merely outlined here. The light-emitting diode 25, which is constructed here from a plurality of white-emitting. LED chips fitted on a common submount, is arranged so near the lower light entry surface 21 that light emitted by it mostly enters the lower light entry surface 21, with only a small portion of it being radiated onto the inner side 13 of the wall 5 of the holding frame 2. No light is radiated by the LED 25 directly through the free interspace between optical element 3 and wall 5. Light incident on the inner side 13 is absorbed by the light-absorbing property thereof. Consequently, light is output to the outside (here: upward) only by the optical element 3. To be more exact, light entering the lower light entry surface 21 runs either directly through the optical element 3 as far as the upper light exit surface 22, from where it is re-emitted; or light beams striking the side walls 20 of the optical element 3 are retroreflected into the optical element 3 again by means of total internal reflection (TIR). The result of this is a desired illumination pattern having only low radiation losses.

Of course, the present invention is not limited to the exemplary embodiments shown.

Thus, instead of PPS it is also possible to use another plastic, preferably a thermoplastic one. The latter is preferably opaque. The holding frame need not be fabricated from plastic either, but can also have metal, for example. There is no restriction as to the type of the optical element. Instead of the TIR concentrator with a design substantially in the shape of a truncated a pyramid, it is also possible, for example, to use a basic shape which is substantially that of a truncated cone.

It is, however, also possible instead of a TIR concentrator to make use, for example, of a CPC-like, CEC-like or CHC-like concentrator, or else a freeform concentrator.

It is also possible to use a combined concentrator/diffraction optics, for example by applying diffraction structures to a concentrator.

It is also possible to make general use of deflecting prisms.

Alternatively, refracting optical elements (such as lenses) and/or diffracting optical elements (such as a Fresnel zone plate or a diffraction grating) can also particularly be held in the holding frame.

It is also possible to use a combined concentrator/diffraction optics, for example by applying diffraction structures to a concentrator.

The optical element can have a microstructured surface for the purpose of beam shaping (for example a so-called pillow structure).

The number of the fastening regions, in particular fastening projections, of the optical element and of the accommodating regions of the holding frame is not limited. Thus, there can also be present more than two fastening regions and associated accommodating regions, or only a single fastening and accommodating region, for example in the form of a partially or completely circumferential edge.

Again, more accommodating regions than projections can be present.

Instead of bonding or caulking, in particular hot caulking, it is also possible to use other fastening methods, such as latching tight, for example by means of a snap connection, clamping, for example by means of a spring clip, by means of shrinking on, ultrasonic welding or press fitting.

In the case of the snap connection or of clamping, it is possible, in particular, for the projections of the optical element to be snapped or clamped into the holding frame. In this case, the outlay for mounting is particularly low. Again, the mechanical loads can be substantially reduced here by the use of the projections and the otherwise free bearing.

In the case of shrinking on, the holding frame is preferably laid around the projections of the optical element, and then shrunk on, the optical element being brought into a firm seat by the projections. The shrinking on can be carried out by means of hot-joining or cold-joining with subsequent cooling or heating up.

The fastening projections can also be connected to the holding frame by means of injection molding. By comparison with a completely circumferential fastening, for example by means of a circumferential fastening edge, there is, firstly, the advantage that the thermal loading of the optical element is much lower, and secondly that the connection is easier to make by injection molding. A further advantage of the fastening using only projections consists in the well defined bright/dark boundary.

The optical element can consist of glass or transparent plastic, in particular of silicone.

The semiconductor light source preferably comprises at least one light-emitting diode. The light source can be available, for example, as an LED module with a light-emitting diode chip or a plurality of light-emitting diode chips, or as an individual housed LED/individual housed LEDs (LED lamp) that preferably emit(s) white light, for example a conversion LED. If a plurality of light-emitting diodes are available, they can, for example, shine with the same color (one or more than one color) and/or with different colors. Thus, an LED module may have a plurality of individual LED chips (LED cluster) that together yield a white mixed light, for example in "cold white" or "warm white". In order to produce a white mixed light, the LED cluster preferably comprises light-emitting diodes that shine in the primary colors of red (R), green (G) and blue (B). In this case, individual colors or a plurality of colors can also be produced at the same time by a plurality of LEDs; thus, combinations RGB, RRGB, RGGB, RGBB, RGGBB etc. are possible. However, the color combination is not restricted to R, G and B, but can, for example, also comprise white-emitting LED chips. In order to produce a warm white hue, it is also possible, for example, for one or more amber-colored LEDs "amber" (A) to be available. An LED module can also have a plurality of white individual chips, it thereby being possible to achieve a simple scalability of the light flux. The individual chips and/or the modules can be equipped with suitable optics for beam guidance, for example Fresnel lenses, collimators, and so on. It is possible to arrange at one contact a plurality of LED modules that are identical or of different types, for example a plurality of identical LED modules on the same substrate. Instead of, or in addition to, inorganic light-emitting diodes, for example based on InGaN or AlInGaP, it is also possible to make general use of organic LEDs (OLEDs). Diode lasers, for example, can also be used.

LIST OF REFERENCE NUMERALS

1 Optical system
2 Holding frame
3 Optical element
4 Basic body
5 Wall
6 Inner cavity
7 Upper edge
8 Depression
9 Lug 10 Lug
11 Guide pin
12 Through-hole
13 Inner side of the wall
14 Basic body of the optical element
15 Projection
16 Optical system
17 Holding frame
18 Basic body of the holding frame
19 Beaded edge
20 Side wall
21 Lower light entry surface
22 Upper light exit surface
23 Region of the optical element in the shape of a truncated pyramid
24 Region of extent
25 Light-emitting diode

The invention claimed is:

1. An illumination device comprising:
   at least one light source;
   at least one holding frame consisting of an opaque material; and
   at least one optical element comprising fastening projections extending laterally parallel therefrom,
   wherein the fastening projections are integrally formed with the optical element such that a top face of the optical element is coplanar with top faces of the fastening projections, the optical element being fastenable to the at least one holding frame only by the fastening projections,
   wherein the optical element further comprises a body portion extending away from a bottom face of the optical element, the bottom face of the optical element being opposite to the top face of the optical element, and a lower light entry surface provided at an end of the body portion which is furthest from the bottom face of the optical element, the lower light entry surface being parallel to the top face of the optical element and facing a light emitting surface of the at least one light source,
   wherein accommodating regions are formed as depressions in an upper edge of the holding frame, said accommodating regions respectively accommodating matching ones of the fastening projections extending from the optical element, and
   wherein, when the fastening projections are received in the accommodating regions, (i) an outer circumferential side surface of each of the fastening projections contacts an inner circumferential side surface of a respective one of the accommodating regions, (ii) the top face of the optical element and the top faces of the fastening projections are substantially flush with a top surface of the upper edge of the holding frame, and (iii) side surfaces of the optical element do not contact the holding frame.

2. The illumination device as claimed in claim 1, wherein the holding frame consists of a plastic.

3. The illumination device as claimed in claim 2, wherein the holding frame consists of PPS.

4. The illumination device as claimed in claim 2, wherein the plastic of the holding frame is blackened.

5. The illumination device as claimed in claim 1, wherein the holding frame has a closed circumferential wall laterally surrounding the optical element.

6. The illumination device as claimed in claim 5, wherein an inner side of the wall is directed toward the optical element and has a light-absorbing surface structure.

7. The illumination device as claimed in claim 1, wherein the holding frame further has at least one optical element held thereby.

8. The illumination device as claimed in claim 1, wherein the optical element consists of glass.

9. The illumination device as claimed in claim 7 or 8, wherein the at least one optical element is connected to the holding frame by one of injection molding, caulking, bonding in, latching tight, clamping, shrinking on, ultrasonic welding and press fitting.

10. The illumination device as claimed in claim 1, wherein the at least one optical element is adapted for beam shaping by means of total internal reflection and/or diffraction.

11. The illumination device as claimed in claim 10, wherein the optical element has a CPC-like region, a CEC-like region and/or a CHC-like region.

12. The illumination device as claimed in claim 10, wherein the optical element has a region like a truncated pyramid or a region like a truncated cone.

13. The illumination device as claimed in claim 1, wherein the light source is a semiconductor light source that is upstream of the optical element.

14. The illumination device as claimed in claim 13, wherein the optical element is downstream of the semiconductor light source, the optical element being primary optics.

15. The illumination device as claimed in claim 13, wherein the semiconductor light source is a light-emitting diode.

16. The illumination device as claimed in claim 1, wherein the illumination device is a vehicle headlight module.

17. The illumination device as claimed in claim 1, wherein a space exists between an inner circumferential surface of the holding frame and the side surfaces of the optical element.

18. The illumination device as claimed in claim 1, wherein the body portion has a shape of a truncated pyramid such that the body portion gradually narrows as it extends away from the bottom face.

* * * * *